United States Patent
Pang et al.

(10) Patent No.: US 9,619,691 B2
(45) Date of Patent: Apr. 11, 2017

(54) MULTI-VIEW 3D OBJECT RECOGNITION FROM A POINT CLOUD AND CHANGE DETECTION

(71) Applicants: Guan Pang, Los Angeles, CA (US); Jing Huang, Los Angeles, CA (US); Amir Anvar, Houston, TX (US); Michael Brandon Casey, Houston, TX (US); Christopher Lee Fisher, Houston, TX (US); Suya You, Los Angeles, CA (US); Ulrich Neumann, Manhattan Beach, CA (US)

(72) Inventors: Guan Pang, Los Angeles, CA (US); Jing Huang, Los Angeles, CA (US); Amir Anvar, Houston, TX (US); Michael Brandon Casey, Houston, TX (US); Christopher Lee Fisher, Houston, TX (US); Suya You, Los Angeles, CA (US); Ulrich Neumann, Manhattan Beach, CA (US)

(73) Assignees: University of Southern California, Los Angeles, CA (US); Chevron U.S.A. Inc., San Ramon, CA (US)

( * ) Notice: Subject to any disclaimer, the term of this patent is extended or adjusted under 35 U.S.C. 154(b) by 210 days.

(21) Appl. No.: 14/641,171

(22) Filed: Mar. 6, 2015

(65) Prior Publication Data

US 2015/0254499 A1   Sep. 10, 2015

Related U.S. Application Data

(60) Provisional application No. 61/949,469, filed on Mar. 7, 2014, provisional application No. 62/022,562, filed on Jul. 9, 2014.

(51) Int. Cl.
*G06K 9/00* (2006.01)
*G06T 7/00* (2017.01)
(Continued)

(52) U.S. Cl.
CPC ..... *G06K 9/00208* (2013.01); *G06K 9/00691* (2013.01); *G06T 7/001* (2013.01);
(Continued)

(58) Field of Classification Search
CPC .......... G06K 9/00208; G06K 9/00691; G06K 2209/19; G06T 7/0044; G06T 7/001;
(Continued)

(56) References Cited

PUBLICATIONS

Pang, Guan, and Ulrich Neumann. "Fast and Robust Multi-View 3D Object Recognition in Point Clouds." 3D Vision (3DV), 2015 International Conference on. IEEE, 2015.*
(Continued)

*Primary Examiner* — Bhavesh Mehta
*Assistant Examiner* — Menatoallah Youssef
(74) *Attorney, Agent, or Firm* — Andrew J. Lagatta; Melissa M. Hayworth; E. Joseph Gess

(57) ABSTRACT

A method of detecting objects in three-dimensional (3D) point clouds and detecting differences between 3D point clouds and the objects therein is disclosed. A method includes receiving a first scene 3D point cloud and a second scene 3D point cloud, wherein the first scene 3D point cloud and the second scene 3D point cloud include first and second target objects, respectively; aligning the first scene 3D point cloud and the second scene 3D point cloud; detecting the first and second target objects from the first scene 3D point cloud and the second scene 3D point cloud, respectively; comparing the detected first target object with the detected second target object; and identifying, based on the comparison, one or more differences between the detected first target object and the detected second target object. Further aspects relate to detecting changes of target objects within scenes of multiple 3D point clouds.

19 Claims, 12 Drawing Sheets

(51) Int. Cl.
 *H04N 13/00* (2006.01)
 *H04N 13/02* (2006.01)
(52) U.S. Cl.
 CPC ........ *G06T 7/0044* (2013.01); *G06K 2209/19* (2013.01); *G06T 2207/10028* (2013.01); *G06T 2207/30108* (2013.01); *H04N 13/0011* (2013.01); *H04N 13/0275* (2013.01)
(58) Field of Classification Search
 CPC  G06T 2207/10028; G06T 2207/30108; H04N 13/0275; H04N 13/0011
 See application file for complete search history.

(56) References Cited

PUBLICATIONS

Huang, Jing, and Suya You. "Detecting objects in scene point cloud: A combinational approach." 2013 International Conference on 3D Vision-3DV 2013. IEEE, 2013.*

\* cited by examiner

MULTI-VIEW 3D OBJECT RECOGNITION FROM A POINT CLOUD AND CHANGE DETECTION

CROSS REFERENCE TO RELATED APPLICATIONS

The present application claims priority from U.S. Provisional Patent Application No. 61/949,469, filed Mar. 7, 2014, and U.S. Provisional Patent Application No. 62/022,562, filed on Jul. 9, 2014, the disclosures of each of which are hereby incorporated by reference in their entireties.

BACKGROUND

The recognition of three dimensional (3D) objects in point clouds is a challenging problem, with issues arising from discrete sampling, occlusions, and oftentimes cluttered scenes. Many existing methods use prior segmentation of 3D images or 3D descriptor training and matching, which are both time consuming and complex processes, especially for large-scale industrial or urban street data. For example, many existing systems select the best description for a specific type of 3D object so the objects can be recognized in a busy scene, and typically use prior segmentation of input data.

Still further, relatively few methods for 3D object recognition may be applied to an industrial scene. For example, in an industrial scene, objects are oftentimes more densely arranged, making segmentation more difficult. Regardless of the domain, most methods perform the recognition process in 3D, either using 3D local descriptors or exhaustive 3D scanning-window search. Both of these approaches typically use 3D descriptor or detector training and are time-consuming due to the 3D search, especially considering the millions or more 3D data points contained in industrial scenes. Furthermore, certain objects in an industrial scene do not remain stagnant, and it is oftentimes difficult to account for the differences.

Thus, there is a need in the art for an improved manner of recognizing objects and detecting changes.

SUMMARY

In general terms, this disclosure is directed to the detection of objects in a 3D point cloud and the detection of changes among one or more 3D point clouds. In a first aspect, the present disclosure is directed to a computer-implemented method of recognizing an object in a three dimensional point cloud, the method comprising: receiving a first scene three-dimensional (3D) point cloud and a first target object 3D point cloud; projecting the first scene 3D point cloud into a first plurality of two-dimensional (2D) depth images; projecting the first target object 3D point cloud into a second plurality of 2D depth images; detecting the second plurality of 2D depth images in the first plurality of 2D depth images, resulting in a first plurality of 2D detection locations; re-projecting, into 3D space, the first plurality of 2D detection locations; and determining 3D locations of the detected first target object from the re-projected first plurality of 2D detection locations to detect the first target object.

In a second aspect, the present disclosure is directed to a computer-implemented method of detecting differences between three-dimensional (3D) point clouds, the method comprising: receiving a first scene 3D point cloud and a second scene 3D point cloud, wherein the first scene 3D point cloud and the second scene 3D point cloud include first and second target objects, respectively; aligning the first scene 3D point cloud and the second scene 3D point cloud; detecting the first and second target objects from the first scene 3D point cloud and the second scene 3D point cloud, respectively; comparing the detected first target object with the detected second target object; and identifying, based on the comparison, one or more differences between the detected first target object and the detected second target object.

In a third aspect, the present disclosure is directed to a system for detecting changes and recognizing target objects in a three-dimensional (3D) point cloud, comprising: a computing device including a processor and a memory communicatively coupled to the processor, the memory storing computer-executable instructions which, when executed by the processor, cause the system to perform a method comprising: receiving a first scene 3D point cloud and a second scene 3D point cloud, wherein the first scene 3D point cloud and the second scene 3D point cloud include first and second target objects, respectively; aligning the first scene 3D point cloud and the second scene 3D point cloud; detecting the first and second target objects from the first scene 3D point cloud and the second scene 3D point cloud, respectively; wherein detecting the first target object further comprises: receiving a first scene 3D point cloud and a first target object 3D point cloud; receiving a first scene 3D point cloud and a first target object 3D point cloud; projecting the first scene 3D point cloud into a first plurality of two-dimensional (2D) depth images; projecting the first target object 3D point cloud into a second plurality of 2D depth images; detecting the second plurality of 2D depth images in the first plurality of 2D depth images, resulting in a first plurality of 2D detection locations; re-projecting, into 3D space, the first plurality of 2D detection locations; and determining 3D locations of the detected first target object from the re-projected first plurality of 2D detection locations to detect the first target object; wherein detecting the second target object further comprises: receiving a second scene 3D point cloud and a second target object 3D point cloud; projecting the second scene 3D point cloud into a third plurality of 2D depth images; projecting the second target object 3D point cloud into a fourth plurality of 2D depth images; detecting the fourth plurality of 2D depth images in the third plurality of 2D depth images, resulting in a second plurality of 2D detection locations; re-projecting, into 3D space, the second plurality of 2D detection locations; and determining 3D locations of the detected second target object from the re-projected second plurality of 2D detection locations to detect the second target object; comparing the detected first target object with the detected second target object; and identifying, based on the comparison, one or more differences between the detected first target object and the detected second target object.

DETAILED DESCRIPTION

Figure 1:
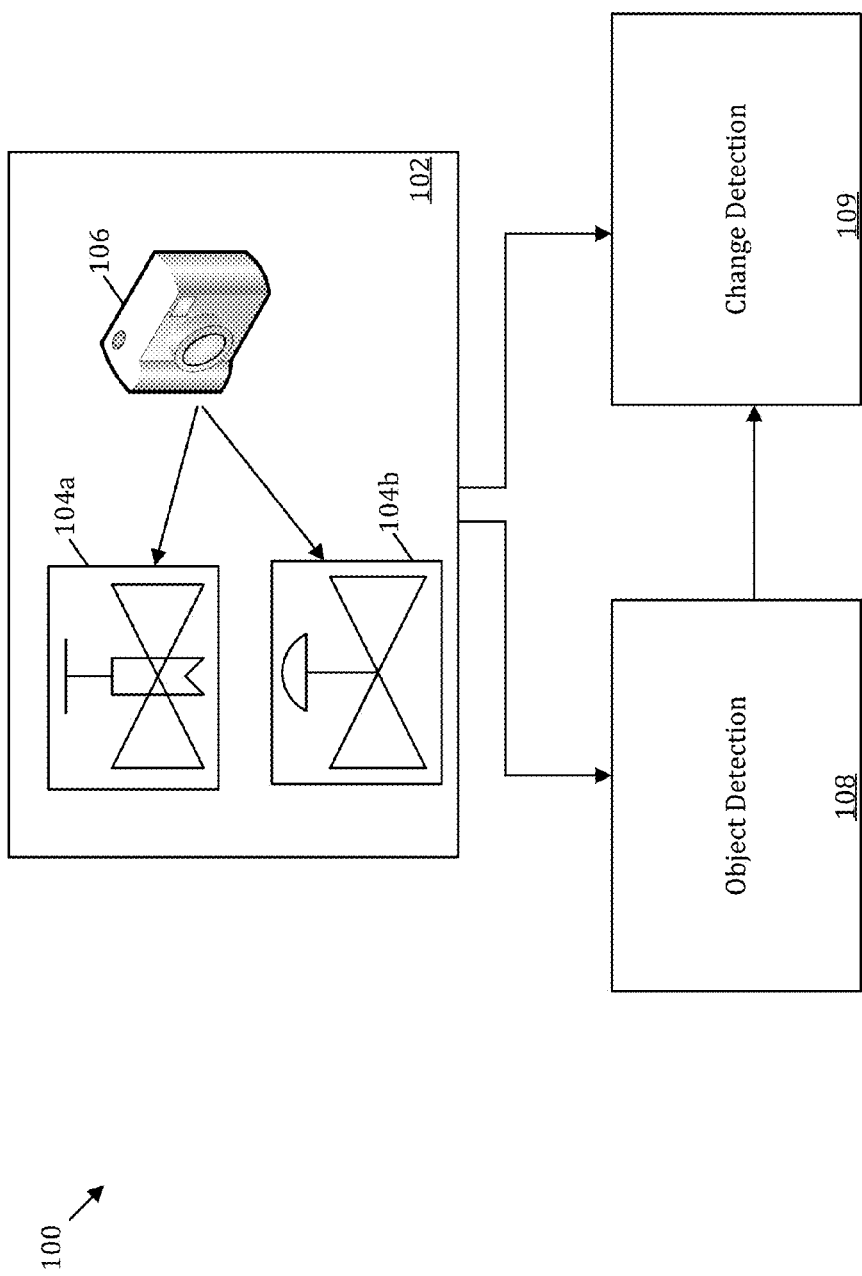
FIG. 1 is an example schematic block diagram illustrating the relationship between the 3D point clouds and target object detection and change detection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Aspects of this disclosure focus on object recognition and change detection within 3D images, and in particular, industrial 3D images. For example, the terminology "industrial scene" is used for simplicity herein, and an industrial scene may correspond to, but is not limited to, industrial sites or facilities, refineries, hydrocarbon fields (e.g., oil fields, gas fields, hydrocarbon producing fields, etc.), pipelines, machinery, and/or non-hydrocarbon related applications.

In particular, an object recognition approach is provided, wherein the object recognition method projects a 3D point cloud into several 2D depth images from multiple viewpoints. Accordingly, the complex problems associated with 3D object recognition are transformed into a plurality of less complex 2D detection problems. Target object detection is achieved by projection of 3D point clouds at multiple viewpoints for decomposition into a series of 2D images. Embodiments described herein provide for target object detection to be performed using gradient-based matching, template matching, and/or BRIEF-based matching techniques.

In some embodiments, the disclosed algorithm flows as follows: first the 3D point clouds are projected into 2D images from multiple views, the detected object is viewed separately, and finally all 2D results are re-projected back into 3D space, resulting in a fused 3D object location estimate. The 3D point cloud is projected into 2D images from multiple views, wherein each view is used to locate the target object. Finally, all 2D detection results are re-projected back into 3D space for a fused 3D object location estimate. The benefits of this multi-view projection are threefold. First, each view can compensate for others' missing information, equivalent to a pseudo 3D recognition process with reduced complexity. Second, target objects are also projected from multiple views and detected in all projected scene views, making the recognition process invariant to rotation changes. And third, multiple independent 2D detection processes stabilize the final fused 3D object locations, filtering discrete location offsets common in 2D detection. By doing so, more objects can be detected correctly, which may lead to an increase in accuracy and may provide, for example, a better idea of the large quantity of objects in an industrial site.

Aspects of the present disclosure are further directed to detecting changes among two or more 3D point clouds. More particularly, once target objects are identified using gradient-based matching, template matching, and/or BRIEF-based matching techniques, it is beneficial to detect changes within 3D point clouds over time. As discussed further herein, change detection can be viewed as the inconsistency between global alignment and local alignment. Aspects of this disclosure provide for the alignment of, for example, two sets of point clouds from which changes are detected.

Aspects of this disclosure are directed to detecting changes in industrial applications such as, but not limited to industrial sites or facilities, refineries, hydrocarbon fields (e.g., oil field, gas field, hydrocarbon producing field, etc.), and pipelines, focusing on object level changes. For example, a 3D image of an industrial scene may be taken, for example, of an oil field having an extensive network of pipes including valves. Continuing this example application, a particular valve may represent the target object, wherein it is desired to detect positional changes of the valve over time. In particular, aspects of the present disclosure may be used to (1) detect the target valve in a 3D scan of the valve at a first time and a second time; and (2) identify a positional change of the detected valve between the images taken at the first time and the second time. Accordingly, positional changes of the valve over time may be ascertained using the detection of target objects within 3D point clouds and the change detection process as disclosed herein. In addition to positional changes (e.g., due to translation or rotation of an object), a change may be a removed or missing object, appearance of a new object, replacement of one object with another object, etc. By doing so, more changes can be detected correctly, which may lead to an increase in accuracy and may provide, for example, a better idea of changes among the large quantity of objects in an industrial site. Also, by doing so, changes may be detected faster and with little to no human intervention. In short, accuracy may increase and economic costs may decrease.

FIG. 1 is an example schematic block diagram of an environment 100 illustrating the relationship between 3D point clouds 102 and objects included therein, the detection of target objects 104 included in the 3D point clouds, and detecting changes 106 within the images in the 3D point clouds.

As illustrated in FIG. 1, 3D images are taken of scenes 104a, 104b using a 3D scanner 106, for example in order to generate 3D point clouds. In some embodiments, the scenes represent industrial sites, such as oil fields and include target objects such as valves, pipes, equipment, machinery, etc. In some embodiments, images are taken of industrial sites 104a, 104b periodically and these 3D scenes are stored in a database.

As described in further detail herein, the 3D point clouds are input into an object detection algorithm 108 and a change detection algorithm 109. As will be described in further detail below, the object detection algorithm 108 provides a faster, more accurate method of detecting target objects within 3D scenes 104a, 104b. The detected objects from the object detection algorithm 108 are thereafter used to detect changes among two or more 3D point clouds using the change detection algorithm 109. For example, in order to assess whether a valve has been turned on, a first 3D point cloud of a scene including the valve may be taken at a first point in time. Later, a second 3D point cloud of the scene may be taken at a second point in time. In such an example, the object detection algorithm 108 may be used to detect the valve in each of the first and second 3D point clouds and the change detection algorithm 109 can be used to determine any changes between the detected valve in each scene. Accordingly, aspects of the present disclosure provide for detection of 3D target objects from 3D scenes and changes between target objects in two or more 3D point clouds.

In accordance with the present disclosure, details regarding point cloud object detection and model generation, in addition to those discussed below, are disclosed in U.S. patent application Ser. No. 13/833,078, filed on Mar. 15, 2013 and entitled "Three-Dimensional Point Processing and Model Generation", U.S. patent application Ser. No. 14/201,200, filed on Mar. 7, 2014 and entitled "Three-Dimensional Point Processing and Model Generation", and U.S. patent application Ser. No. 13/929,280, filed on Jun. 27, 2013 and entitled "System and Method of Detecting Objects in Scene Point Cloud", the disclosures of each of which are hereby incorporated by reference in their entireties. Details regarding point cloud object detection or recognition, in addition to those discussed below, are also provided in the paper: Pang, Guan et al., "Automatic 3D Industrial Point Cloud Classification and Modeling", SPE Western Regional Meeting, Garden Grove, Calif., Apr. 27-30, 2015, the disclosure of which is also incorporated by reference in its entirety. Furthermore, details regarding detection of changes in such scenes are provided in the paper: Huang, Jing et al., "Change Detection in Laser-Scanned Data of Industrial Sites", IEEE Winter Conference on Applications of Computer Vision (WACV), Waikoloa Beach, Hi., January 2015, the disclosure of which is also incorporated by reference in its entirety.

Figure 2:
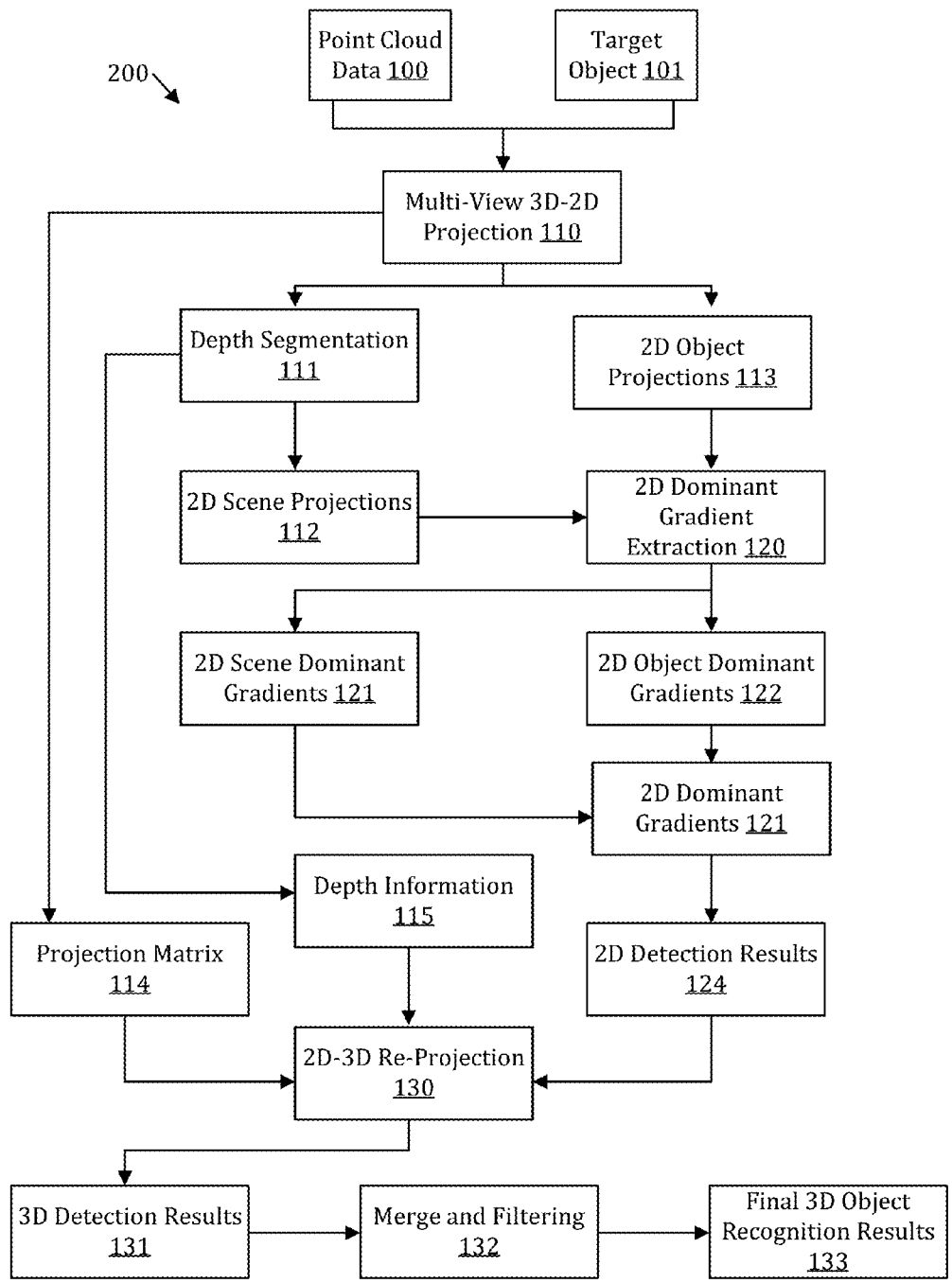
FIG. 2 illustrates an embodiment of a 3D point cloud object recognition algorithm using gradient-based detection.

FIG. 2 illustrates a 3D point cloud object recognition algorithm 200 using gradient-based detection. The algorithm or method 200 may be the object detection algorithm 108 of FIG. 1. In the example, the algorithm 200 receives, as input, point cloud data 100. Point cloud data 100 is a data array of 3D coordinates in a specified coordinate system. These points can be obtained from LiDAR or other sensor systems. These points convey surface points in a scene. Still further, the algorithm 200 receives, as input, at least one target object 101, which is presented to the algorithm as 3D point cloud data. In an example embodiment, the input target object 101 includes surface point samples of the object to be recognized in the scene.

In multi-view 3D-2D projection step 110, the 3D point clouds are transformed into a series of 2D images. In some embodiments, the transformation is performed at multiple viewing angles to preserve the 3D information. For each view, the 3D input point cloud is projected into a 2D depth image with the intensity of each pixel corresponding to depth information. This is performed by splitting the 3D space into cells, wherein each cell that is occupied by a point is considered fully occupied. Along the view line extended from a pixel, the occupied cell closest to the viewpoint (with smallest depth) decides the value of that pixel.

A point cloud scene may be too crowded or cluttered to be rendered in one depth image without objects occluding or interfering with each other in the image. In larger scenes, such crowding occurs more frequently, which degrades the performance and stability of the algorithm 200. Accordingly, in the depth segmentation step 111, the scene undergoes depth segmentation, wherein the depth image is decomposed into different sections or slices according to the depth in each view. Such depth segmentation separates the projected image data into multiple layers and reduces occlusions while relative depth information between sections remains. In some embodiments, the separation is performed at a fixed depth span or adaptively based on the distribution of depth samples or other statistics. For each section or slice, the depth range is limited, so the image is rendered as a binary image without depth information.

In an example embodiment, a series of 2D images of the scene are projected in step 112 from the input point cloud data 100 at multiple viewpoint and depth sections, which are later used for 2D detection in step 122. Still further, the target object is projected into 2D images from multiple viewpoints in the 2D object projections in step 113. In some embodiments, the target object is not separated into depth slices because the object itself is isolated and has known borders. Each view and depth section for each target object projection, as a result of step 113, is detection-tested, resulting in a series of 2D object detection tasks.

In this embodiment, a 2D detection algorithm based on gradients computed from raw image pixels is performed in step 123. A gradient is computed at each pixel, by comparing two neighboring pixels in both the x- and y-directions, producing, for example, eight discrete gradient directions. Gradients within a small grid (size 8×8) are summed into a histogram of gradients. The dominant gradients, which have an intensity above a predetermined threshold, are then extracted in step 120. This use of gradients reduces the number of values to be compared while representing the most descriptive features of the object.

Dominant gradients for all grids are extracted for every projected image of both scene and object, resulting in scene gradients in step 121 and object gradients in step 122. Thereafter, 2D object detection is performed on the scene gradients and object gradients in step 123. In particular, the 2D object detection is performed in an exhaustive window searching process. Scene gradients and object gradients are matched grid-by-grid, and summed up to produce the match confidence, weighted by local intensity of gradients to produce the detection confidence. The confidence score maps are then filtered with an empirical threshold, followed by non-maximum suppression to locate local maximums as the detected object locations.

All the detected objects in 2D are collected and organized according to their location, view, and depth in step 124. In step 130, the 2D detection results obtained from step 124 are re-projected into a 3D space. Even though each 2D detection result only provides two coordinates, the third coordinate may be estimated, in step 115, from the depth information previously saved. In some embodiments, the re-projection is performed by applying an inverted projection matrix in step 114, wherein the projection matrix was previously obtained from the 3D to 2D projection of step 110.

In step 131, the 3D detection locations are thereafter obtained from re-projecting the 2D detection results into 3D space. Thereafter, in some embodiments, the 3D detection locations are merged and filtered in step 132 to obtain the final 3D object recognition results in step 133. To ensure detection stability, a final 3D object instance is established if enough re-projected 2D detections occur in close proximity. For example, a final 3D object instance is only recognized if enough re-projected 2D detections occur at the same location and in more than half possible views. The term "same location" may be substantially the same location or about the same location, and may include for example, the exact same location or locations in close proximity. Those of ordinary skill in the art will appreciate that other criteria may be alternatively used if enough re-projected 2D detections occur in close proximity.

In embodiments, a final confidence level is computed by averaging the total possible views, wherein the views without detection are considered as having 0 confidence. The average is then filtered by an empirically set threshold. In some embodiments, each possible relative rotation between the scene and the object is summarized separately. When more than one rotation is detected at the same location, the rotation that is detected in the most views is considered as the correct relative rotation.

Figure 3:
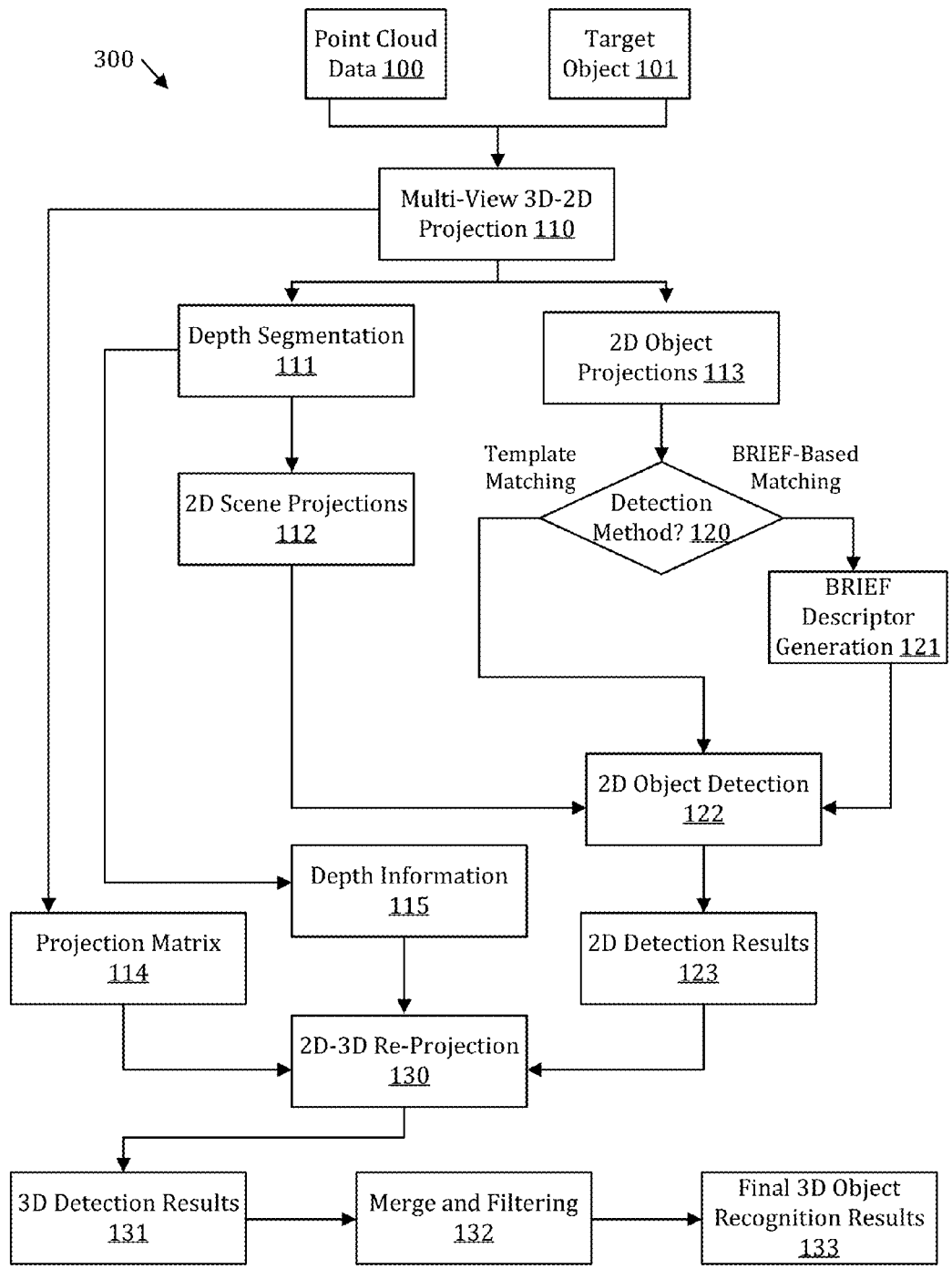
FIG. 3 illustrates an embodiment of a 3D point cloud object recognition algorithm using template-matching and BRIEF-based matching algorithms.

An alternative embodiment of the 3D point cloud object recognition is illustrated in FIG. 3. The algorithm or method 300 may be the object detection algorithm 108 of FIG. 1. In the example, the algorithm 300 receives, as input, point cloud data 100. Point cloud data 100 is a data array of 3D coordinates in a specified coordinate system. These points can be obtained from LiDAR or other sensor systems. These points convey surface points in a scene. Still further, the algorithm 300 receives, as input, at least one target object 101, which is presented to the algorithm as 3D point cloud data. In an example embodiment, the input target object 101 includes surface point samples of the object to be recognized in the scene.

In multi-view 3D-2D projection step 110, the 3D point clouds are transformed into a series of 2D images. In some embodiments, the transformation is performed at multiple viewing angles to preserve the 3D information. For each view, the 3D input point cloud is projected into a 2D depth image with the intensity of each pixel corresponding to depth information. This is performed by splitting the 3D space into cells, wherein each cell that is occupied by a point is considered fully occupied. Along the view line extended from a pixel, the occupied cell closest to the viewpoint (with smallest depth) decides the value of that pixel.

A point cloud scene may be too crowded or cluttered to be rendered in one depth image without objects occluding or interfering with each other in the image. In larger scenes, such crowding occurs more frequently, which degrades the performance and stability of the algorithm 300. Accordingly, in the depth segmentation step 111, the scene undergoes depth segmentation, wherein the depth image is decomposed into different sections or slices according to the depth in each view. Such depth segmentation separates the projected image data into multiple layers and reduces occlusions while relative depth information between sections remains. In some embodiments, the separation is performed at a fixed depth span or adaptively based on the distribution of depth samples or other statistics. For each section or slice, the depth range is limited, so the image is rendered as a binary image without depth information.

In an example embodiment, a series of 2D images of the scene are projected in step 112 from the input point cloud data 100 at multiple viewpoint and depth sections, which are later used for 2D detection in step 122. Still further, the target object is projected into 2D images from multiple viewpoints in the 2D object projections step 113. In some embodiments, the target object is not separated into depth slices because the object itself is isolated and has known borders. Each view and depth section for each target object projection, as a result of step 113, is detection-tested, resulting in a series of 2D object detection tasks.

In this algorithm 300, at least two different detection methods 120 may be used: template matching and BRIEF-based matching.

In BRIEF-based matching, in step 122, generating a BRIEF descriptor is performed automatically. In some embodiments, 128 point pairs are randomly generated from each object template, while the coordinates follow a Gaussian distribution with the center of the object as mean and area divided by twenty-five as standard deviation. A 4-by-4 area sum around each point will produce a value, and the binary test comparing the sum values of each point pair produces a bit in the descriptor. In embodiments, the 128 point pairs result in a 128-bit descriptor, which can then be compared to the descriptor extracted from the input image efficiently using hamming distance and binary shifting operations.

Regardless of which method, BRIEF-based matching or template matching, is selected, 2D object detection of step 122 is performed in an exhaustive window searching process. For template matching, the object is used as a template to be searched exhaustively across the whole image. At each searched location, the template and the image patch within the search window are compared pixel-wise to produce a confidence score. The binary images only have two pixel values, 1 for point and 0 for no point. Different value matches are assigned with different weights heuristically. For example, an object point matched to an empty pixel in data has more negative impact than otherwise, because in some embodiments, there are other objects present in the data. The confidence score maps are then filtered with an empirically set threshold. Finally, non-maximum suppression is applied to locate the local minimums as the detected object locations.

For BRIEF-based matching, the pre-generated BRIEF descriptor of step 121 is also exhaustively searched across the entire image and compared to the descriptor extracted from the image using hamming distance and binary shifting operations. A threshold for minimum difference in sum values is set when selecting the descriptor point pairs so that each point pair is sufficiently discriminative, as well as when extracting the descriptor on the input image to filter out noises.

In this embodiment, a 2D detection algorithm based on gradients computed from raw image pixels is performed in step 123. A gradient is computed at each pixel, by comparing two neighboring pixels in both the x- and y-directions, producing, for example, eight discrete gradient directions. Gradients within a small grid (size 8×8) are summed into a histogram of gradients. The dominant gradients, which have an intensity above a predetermined threshold, are then extracted in step 120. This use of gradients reduces the number of values to be compared while representing the most descriptive features of the object.

Dominant gradients for all grids are extracted for every projected image of both scene and object, resulting in scene gradients in step 121 and object gradients in step 122. Thereafter, 2D object detection is performed on the scene gradients and object gradients in step 123. In particular, the 2D object detection is performed in an exhaustive window searching process. Scene gradients and object gradients are matched grid-by-grid, and summed up to produce the match confidence, weighted by local intensity of gradients to produce the detection confidence. The confidence score maps are then filtered with an empirical threshold, followed by non-maximum suppression to locate local maximums as the detected object locations.

All the detected objects in 2D are collected and organized according to their location, view and depth section in step 124. In step 130, the 2D detection results obtained from step 124 are re-projected into 3D space. Even though each 2D detection result only provides two coordinates, the third coordinate may be estimated, in step 115, from the depth information previously saved. In some embodiments, the re-projection is performed by applying an inverted projection matrix in step 114, wherein the projection matrix was previously obtained from the 3D to 2D projection of step 110.

In step 131, the 3D detection locations are thereafter obtained from re-projecting the 2D detection results into 3D space. Thereafter, in some embodiment, the 3D detection locations are merged and filtered in step 132 to obtain the final 3D object recognition results in step 133. To ensure detection stability, a final 3D object instance is established if enough re-projected 2D detections occur in close proximity. For example, a final 3D object instance is only recognized if enough re-projected 2D detections occur at the same location and in more than half possible views. The term "same location" may be substantially the same location or about the same location, and may include for example, the exact same location or locations in close proximity. Those of ordinary skill in the art will appreciate that other criteria may be alternatively used if enough re-projected 2D detections occur in close proximity.

In embodiments, a final confidence level is computed by averaging the total possible views, wherein the views without detection are considered as having 0 confidence. The average is then filtered by an empirically set threshold. In some embodiments, each possible relative rotation between the scene and the object is summarized separately. When more than one rotation is detected at the same location, the rotation that is detected in the most views is considered as the correct relative rotation.

Figure 7:
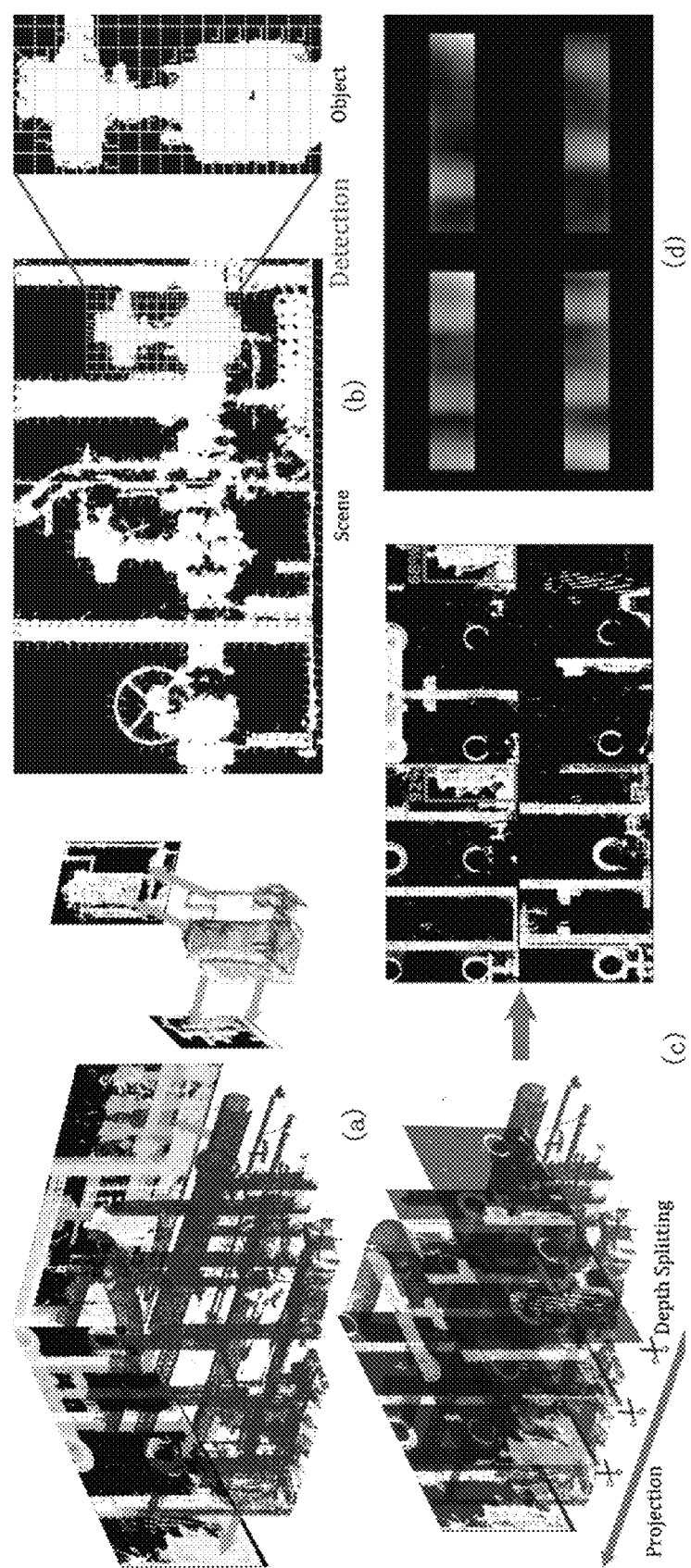
Figure 8:
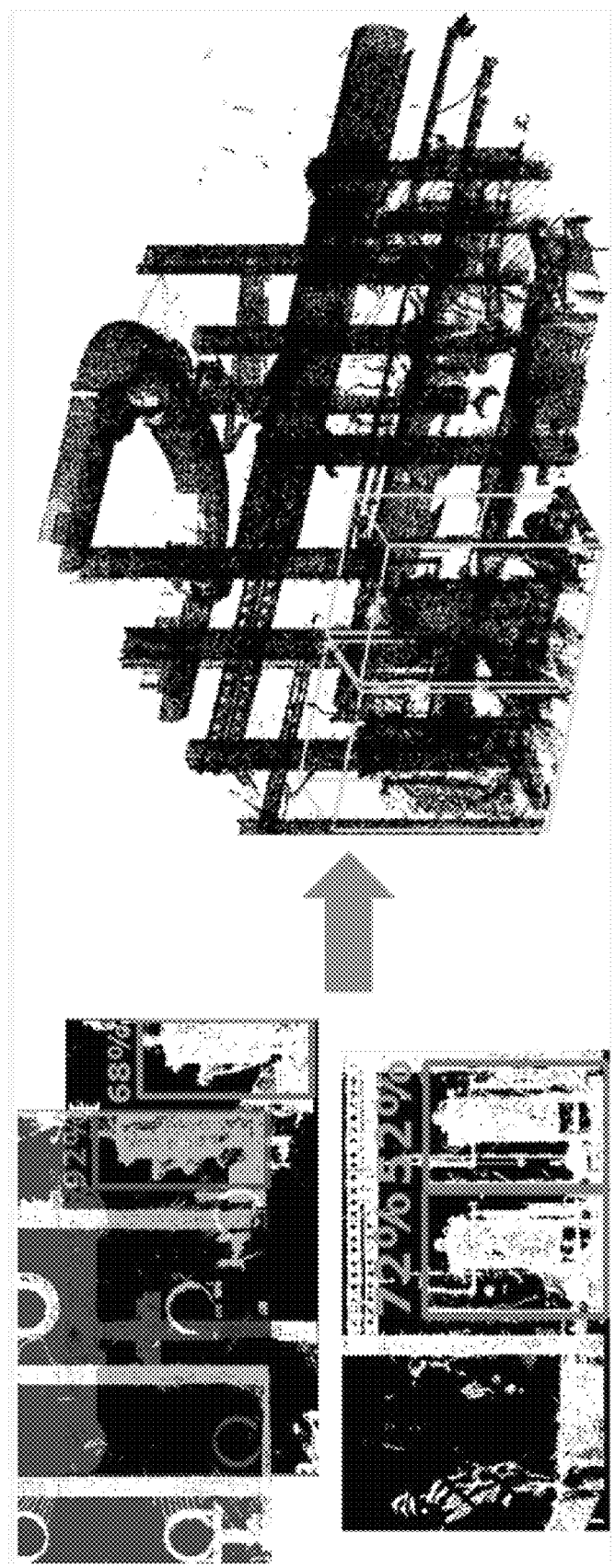
Figure 9:
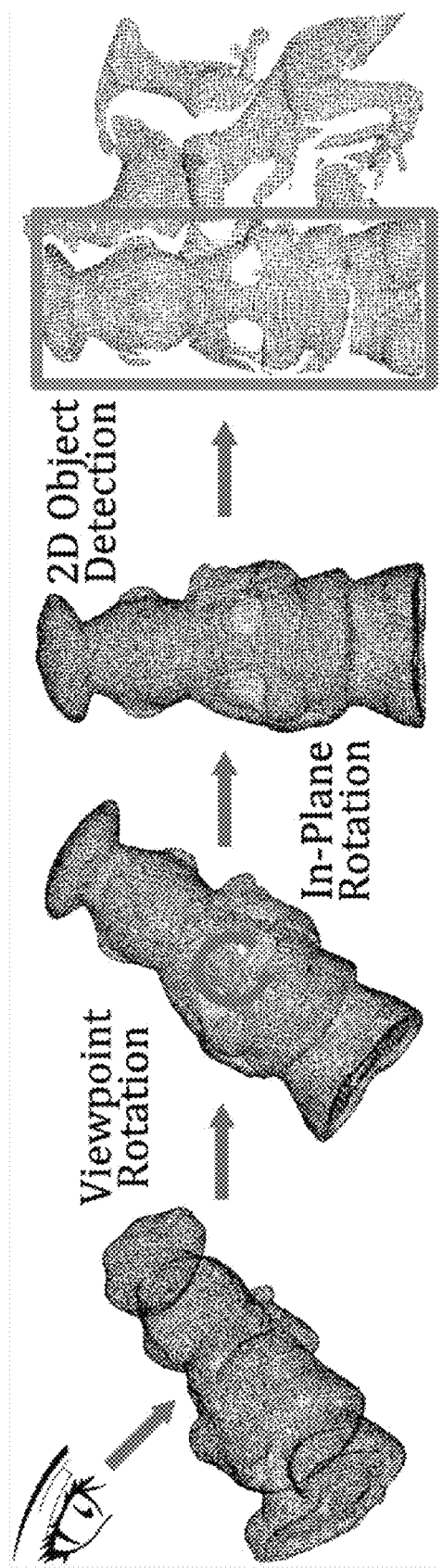

FIGS. 6-9 provide examples consistent with the method 200 of FIG. 2 and/or the method 300 of FIG. 3. For instance, in FIG. 6, the algorithm projects the 3D point clouds into 2D images from multiple views, then detects object in each view separately, and finally re-projects all 2D results back into 3D for a fused 3D object location estimate. In FIG. 7, at (a), a 3D point cloud of the scene and an object are both projected into 2D depth images at multiple views. At (b) of FIG. 7, dominant gradients for all 8×8 grid is computed for every projected image for both object and scene (most scene grid lines are hidden). Image and object patches are matched grid-by-grid for dominant gradients during detection. At (c) of FIG. 7, the scene is segmented into four sections according to depth along one axis and projected into 2D binary images. Indeed, the occluded tank in (a) of FIG. 7 can now be seen in a separate view. Objects are detected at local maximum in a filtered confidence map (i.e., number marks confidence). At (d) of FIG. 7, the 2D object detection confidence score distribution is provided. In FIG. 8, 2D detection results are re-projected into 3D and combined to obtain the 3D object locations. FIG. 9 illustrates that the algorithm may search for both viewpoint rotation and in-plane rotation to achieve rotational invariance.

Figure 4:
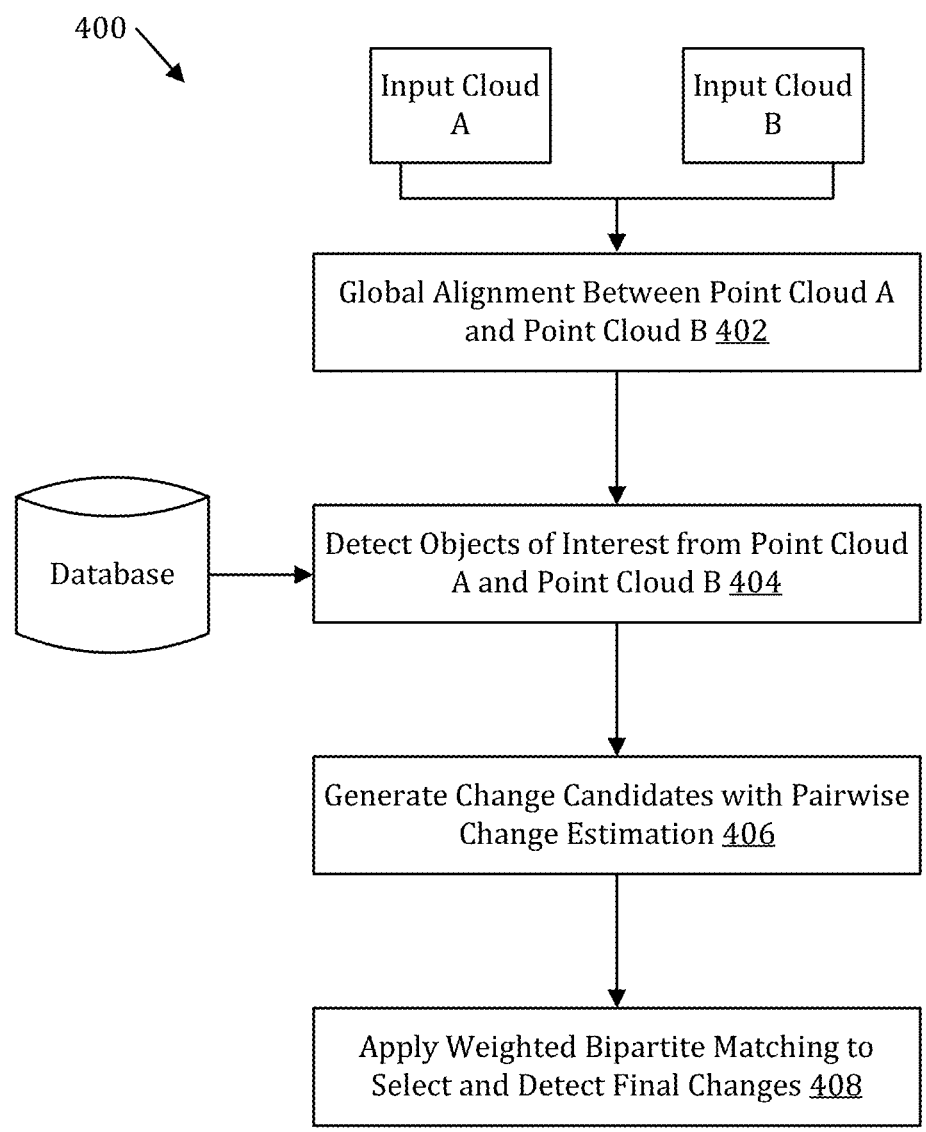
FIG. 4 is a flow chart illustrating an embodiment of a method for change detection between two point clouds.

FIG. 4 is a flow chart illustrating a method 400 for change detection between two point clouds. This method describes three general stages: global data alignment, object detection, and change detection. The algorithm or method 400 may be the object detection algorithm 109 of FIG. 1.

As an initial matter, two 3D point clouds are used as inputs to the change detection method 400. In step 402, point cloud A and point cloud B are globally aligned. In an example embodiment, alignment is performed by an iterative closest point (ICP) method or a sparse iterative closest point (SICP) method. In SICP, a general sparse $l_p$ optimization problem is formulated and p is empirically selected. For example, p=0.4 may be selected as a balance between performance and robustness.

In step 404, the method 400 detects objects of interest from each point cloud. This can be performed by, for example, the gradient-matching detection, template-based detection, or BRIEF-based detection as described with reference to FIGS. 2 and 3 herein. In some embodiments, other object detection methodologies may be used.

In step 406, the method 400 generates change candidates with pairwise change estimation. In particular, given any two detected objects X and Y in different times, several change evaluations are made between them. The most fundamental evaluation is the category to which each of them belongs. If they belong to the same category, the category change is 0, otherwise the change is 1.

$$C_c(X, Y) = \begin{cases} 0, & \text{Cat}(X) = \text{Cat}(Y) \\ 1, & \text{Cat}(X) \neq \text{Cat}(Y) \end{cases},$$

Another significant change between two objects that is immediately observed is the difference in locations. Thus, the location change can be defined as the distance between the centers of the objects $$C_l(X,Y)=\|\bar{X}-\bar{Y}\|.$$

Even if the locations of the two objects are close, in some embodiments, there may be rotational change between them, e.g., a handwheel could be rotated even if it stays in the same location. Let T be the template of X and Y in the database, from the object detection, the following is known:

$$\begin{cases} X = R_1 T + b_1 \\ Y = R_2 T + b_2 \end{cases}$$

Therefore the rotational matrix between X and Y can be directly computed as:

$$R:=R_2 R_1^{-1}.$$

Next, the degree of rotation is determined using Euler angles (yaw, pitch, roll) derived from the rotational matrix $$\begin{cases} \alpha = a\tan2(R_{21}, R_{11}) \\ \beta = a\tan2\left(-R_{31}, (R_{32}^2 + R_{33}^2)^{\frac{1}{2}}\right) \\ \gamma = a\tan2(R_{32}, R_{33}) \end{cases}$$

Next, the rotation change can be represented by the norm in the below equation:

$$C_r(X,Y)=\sqrt{\alpha^2+\beta^2+\gamma^2}.$$

Finally, if the objects are close enough, their degree of overlapping can be measured. Specifically, the overlapping score between the two point clouds is computed, as proposed by:

$$\Omega(A, B) = \frac{|\{x \in A; \exists\, y \in B(\|x-y\| < \theta)\}|}{|A|}$$

The overlapping score with threshold θ=0.005 is defined as the proportion of the points in point cloud A where there exists a point in point cloud B in its θ-neighborhood can be computed according to the above.

The overlap change is defined by:

$$C_\Omega(X,Y)=\sqrt{(1-\Omega(X,Y))^2+(1-\Omega(Y,X))^2}.$$

Finally, if it is presumed that the two objects have a relationship, the reason for the change between the objects can be determined using the similarity scores. If the categories of the two objects are different, then there is a replacement change; otherwise if the overlap change is small than it can be determined that there is no change between the objects. Otherwise the location change and the rotation change are checked by comparing them to thresholds.

Next in step 408, a weighted bipartite matching is applied to select final changes. Given a graph G=(V,E), G is bipartite if there exists partition V=Vx∪Vy s.t. Vx∩Vy=Ø and E ⊆ V×Vy. M⊆E is a matching on G if ∀v∈V there is at most one edge in M that connects v. We can define a weight function, w: E→R on the edges. The weight of M is given by the following equation:

$$w(M) = \sum_{e \in M} w(e).$$

The goal of maximum weight bipartite matching is thus to find arg maxM(w(M)), which can be solved efficiently in O(V 2 log V+V E) with Hungarian algorithm using Fibonacci heap.

The problem can now be converted to the maximum weight bipartite matching problem. Each detected object Xi(1≤i≤n) in the first data and Yj(1≤j≤m) in the second data can be represented by a vertex, and each weighted edge represents the change evaluation value between the objects:

$$w(i,j)=C(Xi,Yj), 1 \leq i \leq n \wedge 1 \leq j \leq m$$

Note that when the change is more significant, by the Gaussian-based definition of function C, the weight is smaller, so to maximize the weights is equivalent to minimize the changes.

Since n and m might not be equal, the dummy vertices are added as well as dummy edges to balance the graph. The traditional method is to assign zero weight to the dummy edges, however, in our case not all objects need to be matched to another object, meaning that certain objects could be preferably matched to a dummy object even if there are unmatched real objects. In the extreme case, all the objects are matched to dummy objects. Therefore, m dummy vertices are added to the X side and n dummy vertices to the Y side, and assign the weights of the dummy edges to be the cutoff threshold:

$$w(i,j)=C0, n < i \leq n+m \vee m < j \leq n+m$$

Finally, for each matched pair (X, Y), if X is a dummy vertex while Y is not, then Y is considered as the new object; if Y is a dummy vertex while X is not, then X is considered as the missing object. The results of this calculation are the detection of changes between the two objects within the point clouds.

Figure 5:
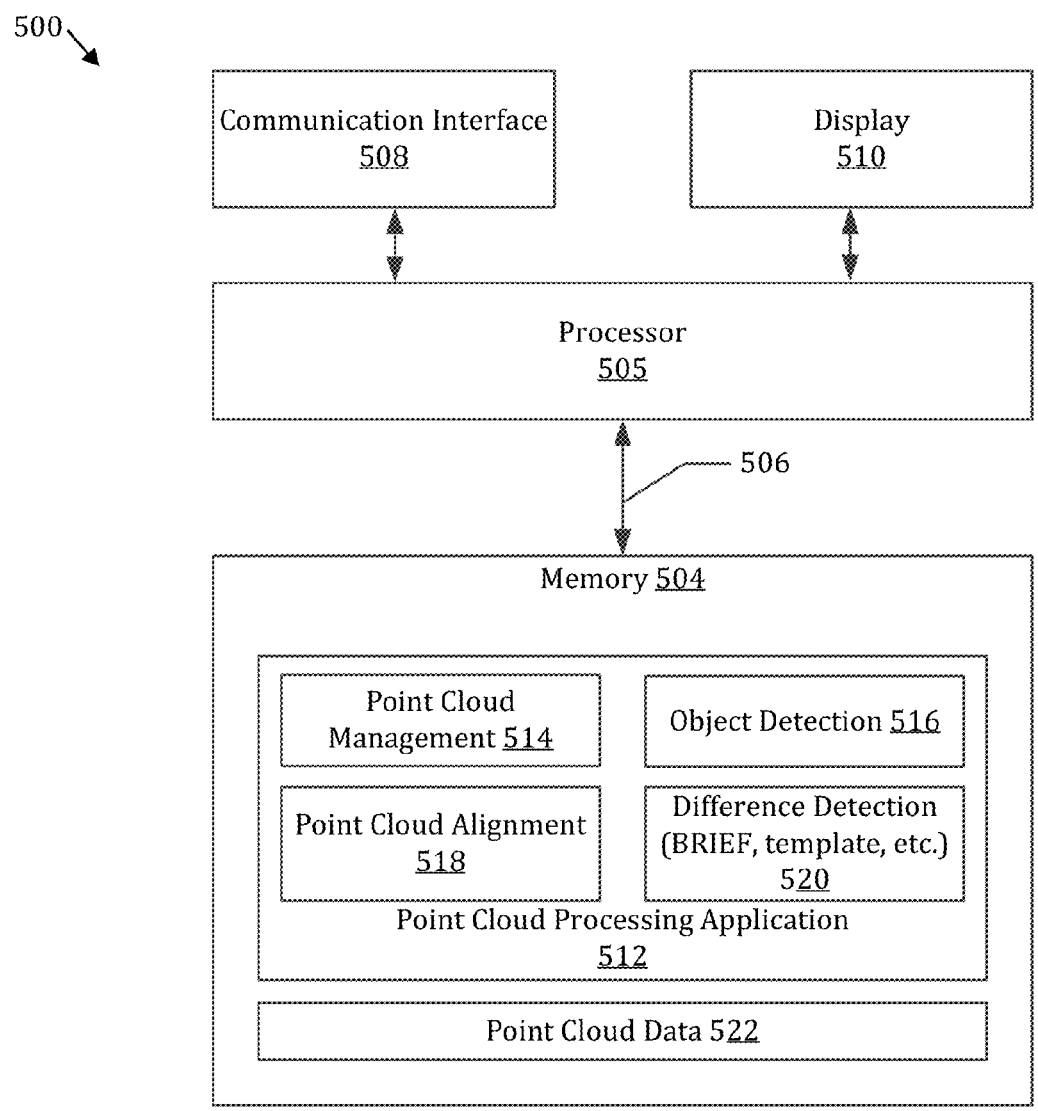
FIG. 5 illustrates an embodiment of a computing system useable to recognize objects and detect differences among point clouds.
Figure 6:
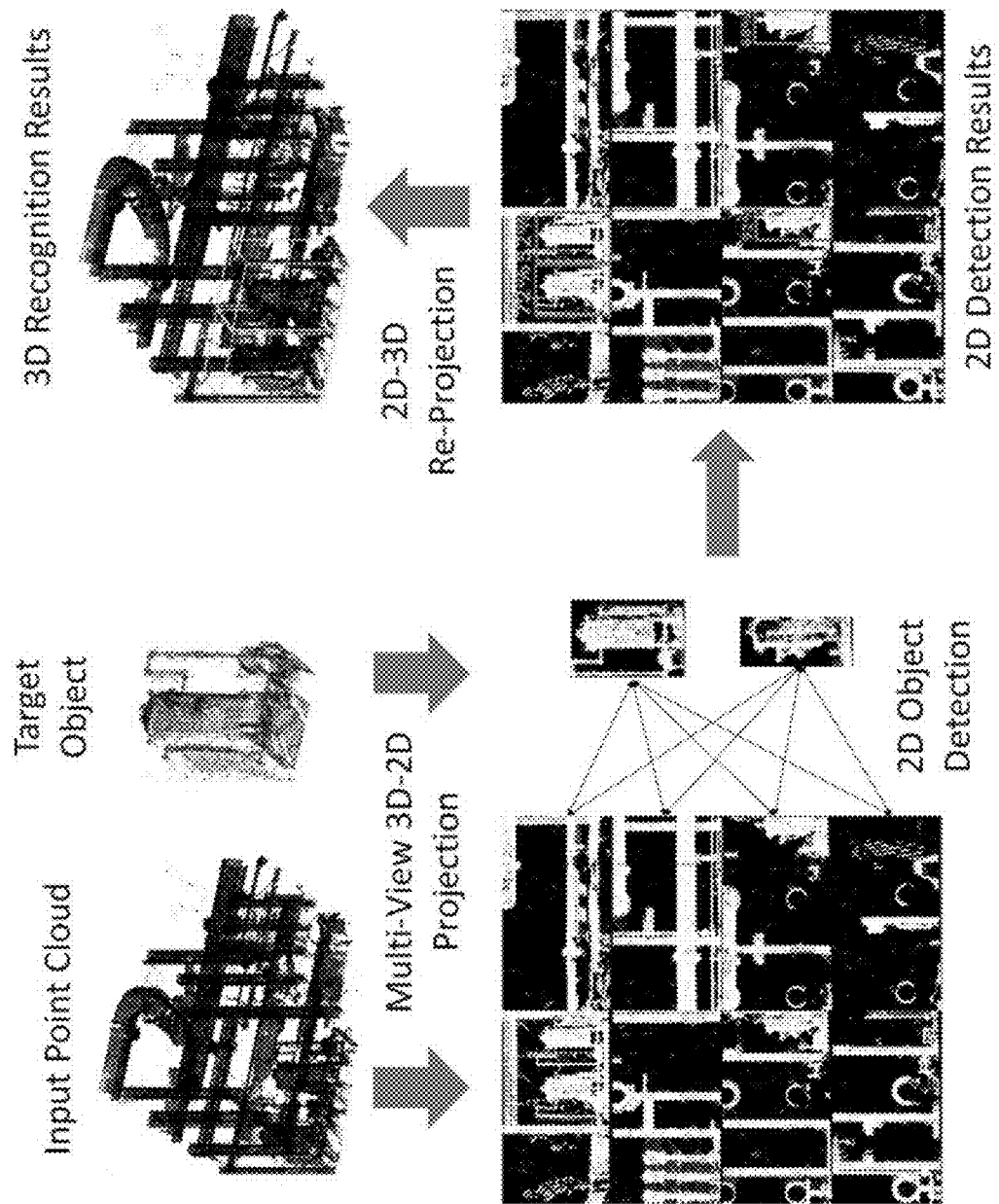
FIGS. 6-9 provide examples consistent with the method of FIG. 2 and/or the method of FIG. 3.
Figure 10:
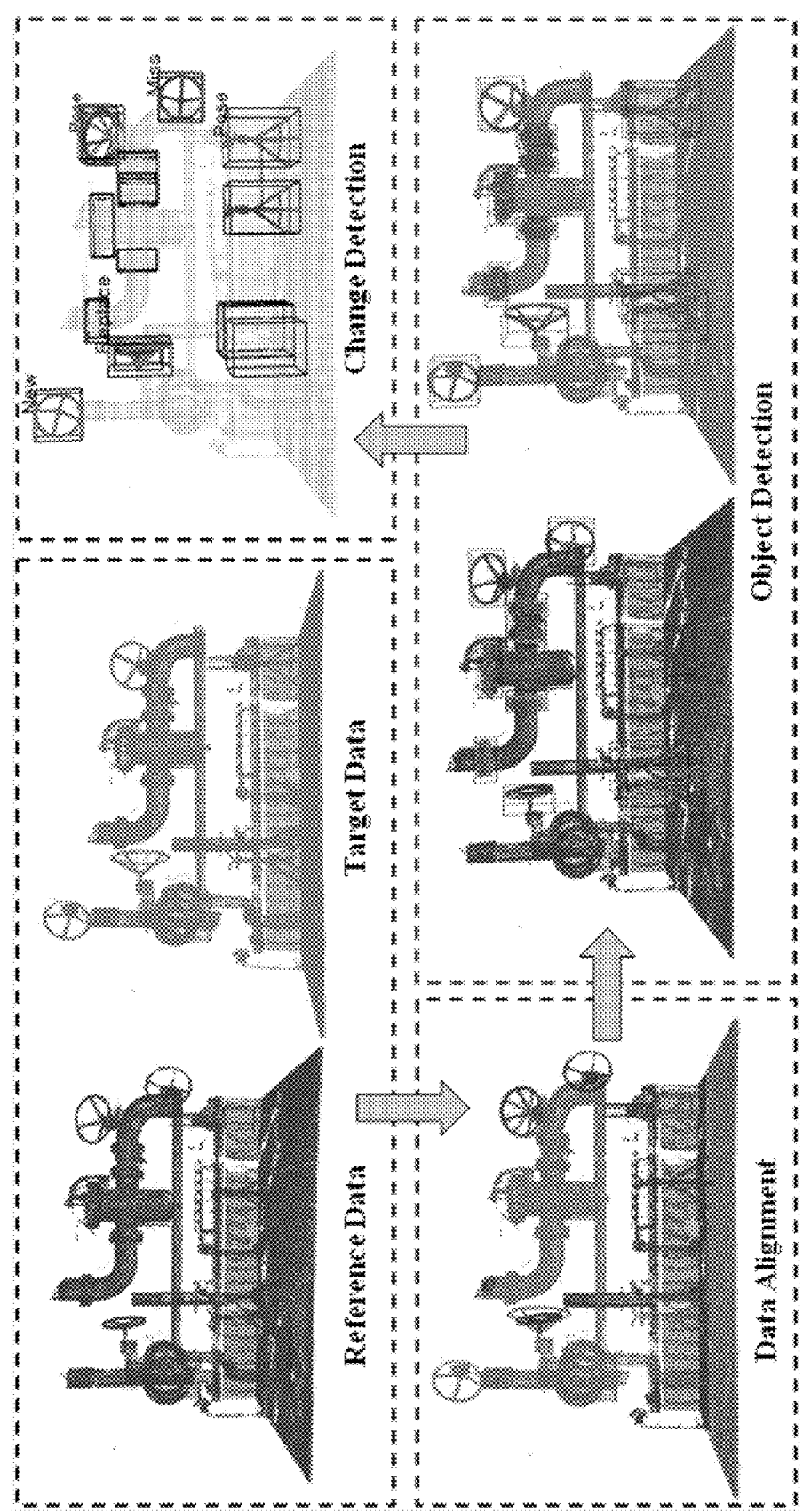
FIGS. 10-12 provide examples consistent with the method of FIG. 5.
Figure 11:
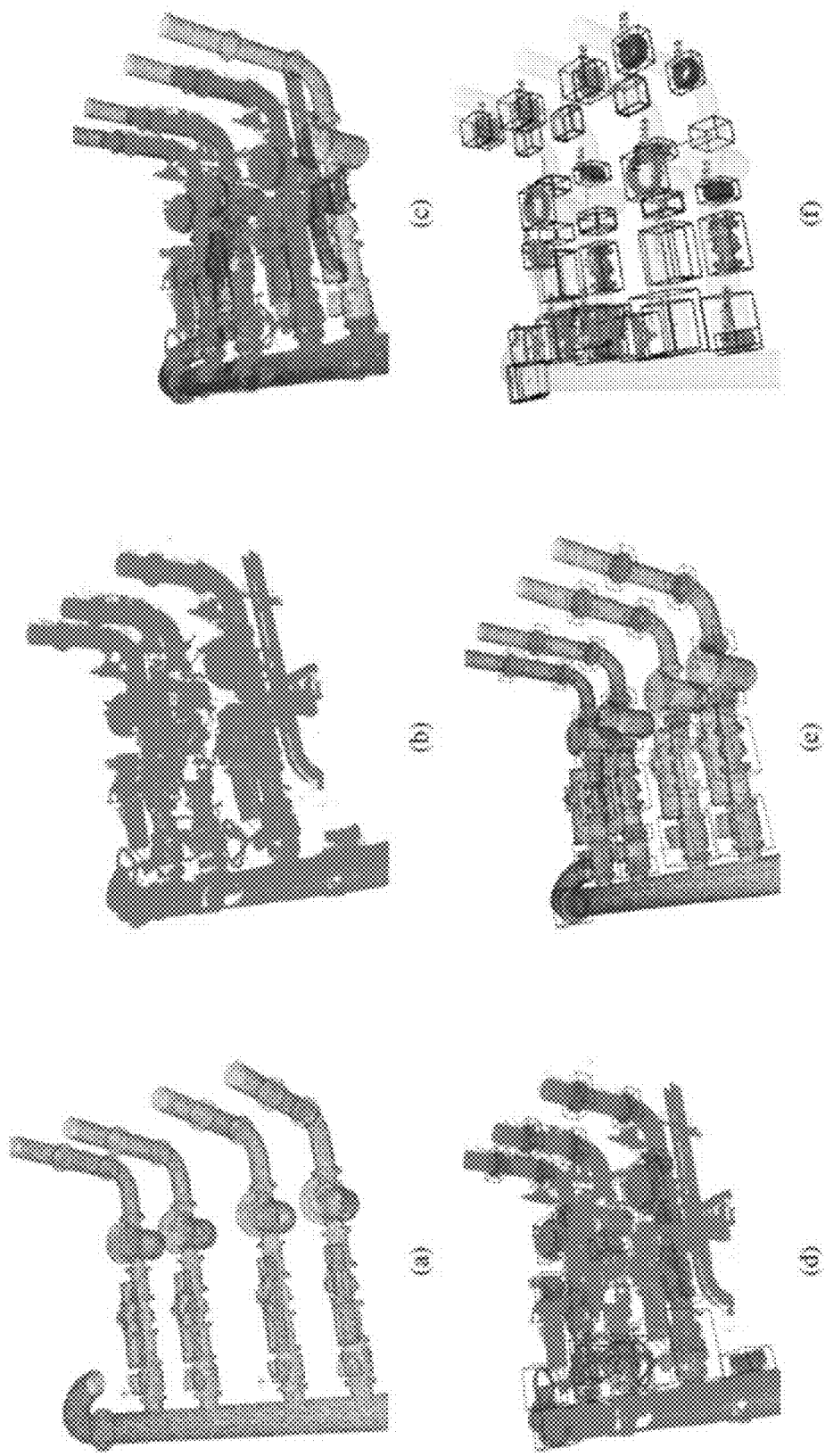
Figure 12:
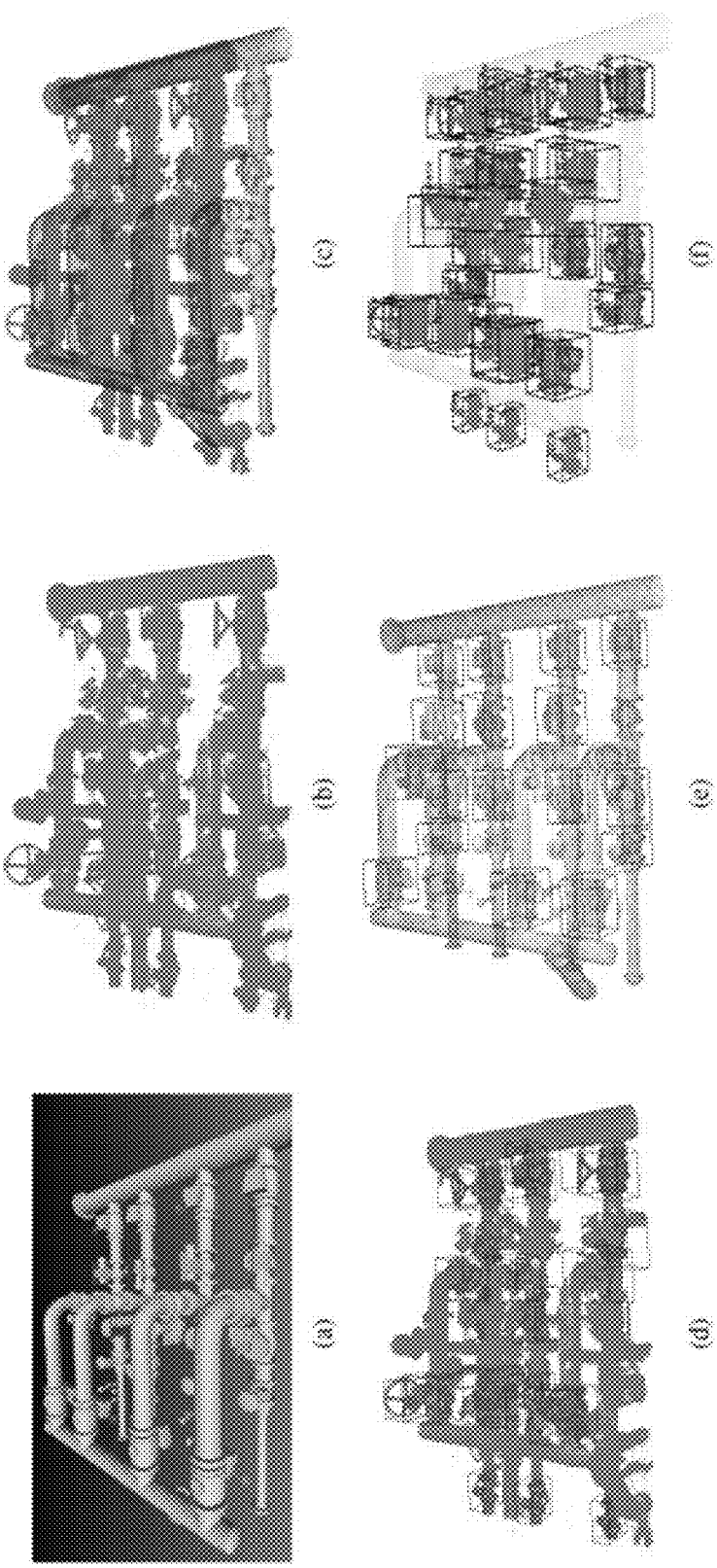

FIGS. 10-12 provide examples consistent with the method 500 of FIG. 5. Examples regarding detection of changes are also provided in the paper: Huang, Jing et al., "Change Detection in Laser-Scanned Data of Industrial Sites", IEEE Winter Conference on Applications of Computer Vision (WACV), Waikoloa Beach, Hi., January 2015, the disclosure of which is also incorporated by reference in its entirety. In FIG. 10, the input contains the reference data and the target data, and results from major stages including global alignment, object detection, and change detection are shown. In FIG. 11, at (a)-(b), point clouds are illustrated. At (c) of FIG. 11, the global alignment result is illustrated. At (d)-(e) of FIG. 11, detection results are illustrated. At (f) of FIG. 11, change detection results are illustrated. In FIG. 12, at (a), a mesh is illustrated. At (b) of FIG. 12, a point cloud is illustrated. At (c) of FIG. 12, the global alignment result is illustrated. At (d)-(e) of FIG. 12, detection results are illustrated. At (f) of FIG. 12, change detection results are illustrated.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

Referring to FIG. 5, a computing system 500 useable to recognize objects and detect differences among point clouds is disclosed. The computing system 500 can, in example embodiments, be communicatively connected to systems providing point cloud data as described in FIGS. 1-2, above.

In general, the computing system 500 includes a processor 505 communicatively connected to a memory 504 via a data bus 506. The processor 505 can be any of a variety of types of programmable circuits capable of executing computer-readable instructions to perform various tasks, such as mathematical and communication tasks.

The memory 504 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 504 may store a point cloud processing application 512, discussed in further detail below. The computing system 500 can also include a communication interface 508 configured to receive and transmit data, for example point cloud data as illustrated in FIGS. 1-3. Additionally, a display 510 can be used for presenting a graphical display of the point cloud processing application 512.

In various embodiments, the point cloud processing application 512 includes a point cloud management component 514, an object detection component 516, an alignment component 518, and a difference detection component 520.

In an example embodiment, the point cloud management component 514 is used to manage 3D point clouds that are used as described herein. For example, the point cloud management component 514 may be used to digitize, analyze, and store 3D point clouds. In an example embodiment, the object detection component 516 is used to operate the object detection algorithm 108 as described herein. In an example embodiment, the alignment component 518 is used to globally align one or more 3D point clouds. In some embodiments, this involves identifying various similar locations within each 3D point cloud and thereafter performing alignment operations in order to be used later during change detection. In an example embodiment, the difference detection component 520 is used to operate the change detection algorithm 109 as described herein. In some embodiments, the difference detection component 520 takes, as input, two or more 3D point clouds, target images as detected using the object detection component, and identifies changes among the two or more 3D point clouds.

Referring generally to the systems and methods of FIGS. 1-5, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, routines, code, applications, programs, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 500, above. Computer storage media does not include a carrier wave or other propagated or modulated data signal. In some embodiments, the computer storage media includes at least some tangible features; in many embodiments, the computer storage media includes entirely non-transitory components.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Embodiments may include fewer than or more than the functionality/acts provided herein.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method of recognizing an object in a three dimensional point cloud, the method comprising:
   receiving a first scene three-dimensional (3D) point cloud and a first target object 3D point cloud;
   projecting the first scene 3D point cloud into a first plurality of two-dimensional (2D) depth images;
   projecting the first target object 3D point cloud into a second plurality of 2D depth images;
   detecting the second plurality of 2D depth images in the first plurality of 2D depth images, resulting in a first plurality of 2D detection locations;
   re-projecting, into 3D space, the first plurality of 2D detection locations; and
   determining 3D locations of the detected first target object from the re-projected first plurality of 2D detection locations to detect the first target object.

2. The computer-implemented method of recognizing an object in a 3D point cloud of claim 1, further comprising:
   receiving a second scene three-dimensional (3D) point cloud and a second target object 3D point cloud;
   projecting the second scene 3D point cloud into a third plurality of two-dimensional (2D) depth images;
   projecting the second target object 3D point cloud into a fourth plurality of 2D depth images;
   detecting the fourth plurality of 2D depth images in the third plurality of 2D depth images, resulting in a second plurality of 2D detection locations;
   re-projecting, into 3D space, the second plurality of 2D detection locations; and
   determining 3D locations of the detected second target object from the re-projected second plurality of 2D detection locations to detect the second target object.

3. The computer-implemented method of recognizing an object in a 3D point cloud of claim 2, further comprising:
   aligning the first scene 3D point cloud and the second scene 3D point cloud;
   comparing the detected first target object with the detected second target object; and
   identifying, based on the comparison, one or more differences between the detected first target object and the detected second target object.

4. The computer-implemented method of recognizing an object in a 3D point cloud of claim 1, wherein detecting the first target object is performed using a gradient-based detection algorithm.

5. The computer-implemented method of recognizing an object in a 3D point cloud of claim 1, wherein detecting the first target object is performed using a template-matching detection algorithm.

6. The computer-implemented method of recognizing an object in a 3D point cloud of claim 1, wherein detecting the first target object is performed using a BRIEF-based detection algorithm.

7. The computer-implemented method of recognizing an object in a 3D point cloud of claim 1, wherein projecting the first plurality of images and the second plurality of images comprises transforming the first scene 3D point cloud and the second scene 3D point cloud into a plurality of 2D images from multiple viewing angles.

8. The computer-implemented method of recognizing an object in a 3D point cloud of claim 7, wherein transforming the first scene 3D point cloud and the second scene 3D point cloud comprises using depth information.

9. The method for recognizing an object in a 3D point cloud of claim 1, wherein detecting the first target object further comprises:
determining a pixel value for each pixel of the 2D depth image;
comparing the pixel value of at least two neighboring pixels in x- and y-directions; and
computing a gradient based on the comparison.

10. A computer-implemented method of detecting differences between three-dimensional (3D) point clouds, the method comprising:
receiving a first scene 3D point cloud and a second scene 3D point cloud, wherein the first scene 3D point cloud and the second scene 3D point cloud include first and second target objects, respectively;
aligning the first scene 3D point cloud and the second scene 3D point cloud;
detecting the first and second target objects from the first scene 3D point cloud and the second scene 3D point cloud, respectively;
comparing the detected first target object with the detected second target object;
and identifying, based on the comparison, one or more differences between the detected first target object and the detected second target object;
wherein detecting the first target object further comprises:
receiving a first scene 3D point cloud and a first target object 3D point cloud;
projecting the scene 3D point cloud into a first plurality of two-dimensional (2D) depth images;
projecting the first target object 3D point cloud into a second plurality of 2D depth images;
detecting the second plurality of 2D depth images in the first plurality of 2D depth images, resulting in a first plurality of 2D detection locations;
re-projecting, into 3D space, the first plurality of 2D detection locations; and
determining 3D locations of the detected first target object from the re-projected first plurality of 2D detection locations to detect the first target object.

11. The computer-implemented method of detecting differences between 3D point clouds of claim 10, wherein detecting the first target object is performed using a gradient-based detection algorithm.

12. The computer-implemented method of detecting differences between 3D point clouds of claim 10, wherein detecting the first target object is performed using a template-matching detection algorithm.

13. The computer-implemented method of detecting differences between 3D point clouds of claim 10, wherein detecting the first target object is performed using a BRIEF-based detection algorithm.

14. The computer-implemented method of detecting differences between 3D point clouds of claim 10, wherein:
projecting the first plurality of images and the second plurality of images comprises transforming the first scene 3D point cloud and the second scene 3D point cloud into a plurality of 2D images from multiple viewing angles; and
transforming the first scene 3D point cloud and the second scene 3D point cloud comprises using depth information.

15. The computer-implemented method of detecting differences between 3D point clouds of claim 10, wherein detecting the first target object further comprises:
determining a pixel value for each pixel of the 2D depth image;
comparing the pixel value of at least two neighboring pixels in x- and y-directions; and
computing a gradient based on the comparison.

16. A system for detecting changes and recognizing target objects in a three-dimensional (3D) point cloud, comprising:
a computing device including a processor and a memory communicatively coupled to the processor, the memory storing computer-executable instructions which, when executed by the processor, cause the system to perform a method comprising:
receiving a first scene 3D point cloud representing an industrial scene at a first time and a second scene 3D point cloud representing the industrial scene at a second time after the first time, wherein the first scene 3D point cloud and the second scene 3D point cloud include first and second target objects, respectively;
aligning the first scene 3D point cloud and the second scene 3D point cloud;
detecting the first and second target objects from the first scene 3D point cloud and the second scene 3D point cloud, respectively;
wherein detecting the first target object further comprises:
receiving a first scene 3D point cloud and a first target object 3D point cloud;
projecting the first scene 3D point cloud into a first plurality of two-dimensional (2D) depth images;
projecting the first target object 3D point cloud into a second plurality of 2D depth images;
detecting the second plurality of 2D depth images in the first plurality of 2D depth images, resulting in a first plurality of 2D detection locations;
re-projecting, into 3D space, the first plurality of 2D detection locations; and
determining 3D locations of the detected first target object from the re-projected first plurality of 2D detection locations to detect the first target object;
wherein detecting the second target object further comprises:
receiving a second scene 3D point cloud and a second target object 3D point cloud;
projecting the second scene 3D point cloud into a third plurality of 2D depth images;
projecting the second target object 3D point cloud into a fourth plurality of 2D depth images;
detecting the fourth plurality of 2D depth images in the third plurality of 2D depth images, resulting in a second plurality of 2D detection locations;
re-projecting, into 3D space, the second plurality of 2D detection locations; and
determining 3D locations of the detected second target object from the re-projected second plurality of 2D detection locations to detect the second target object;
comparing the detected first target object with the detected second target object; and
identifying, based on the comparison, one or more differences between the detected first target object and the detected second target object, thereby detecting one or more changes occurring in the industrial scene between the first time and the second time.

17. The system for detecting changes and recognizing target objects in a 3D point cloud of claim 16, wherein detecting the first and second target objects further comprise:
- determining, for each 2D depth image, a pixel value;
- comparing, for each 2D depth image, the pixel value of at least two neighboring pixels in x- and y-directions; and
- computing, for each 2D depth image, a gradient based on the comparison.

18. The system for detecting changes and recognizing target objects in a 3D point cloud of claim 16, wherein the first target object and the second target object relate to a valve imaged at the first and second times, respectively, wherein the valve is positioned on a pipe in an oil field.

19. The system for detecting changes and recognizing target objects in a 3D point cloud of claim 16, wherein the first target object is at a first position and the second target object is at a second position, wherein the first position is different from the second position.

* * * * *